(12) United States Patent
Smith et al.

(10) Patent No.: US 12,616,176 B2
(45) Date of Patent: May 5, 2026

(54) FISH TANK FILTER

(71) Applicants: Douglas Smith, Higlands Ranch, CO (US); MiChelle Smith, Highlands Ranch, CO (US)

(72) Inventors: Douglas Smith, Higlands Ranch, CO (US); MiChelle Smith, Highlands Ranch, CO (US)

( * ) Notice: Subject to any disclaimer, the term of this patent is extended or adjusted under 35 U.S.C. 154(b) by 891 days.

(21) Appl. No.: 17/892,052

(22) Filed: Aug. 20, 2022

(65) Prior Publication Data

US 2024/0057566 A1 Feb. 22, 2024

(51) Int. Cl.
*A01K 63/04* (2006.01)

(52) U.S. Cl.
CPC .................................. *A01K 63/045* (2013.01)

(58) Field of Classification Search
CPC ...... A01K 63/045; B01D 29/17; B01D 29/27; B01D 29/39; B01D 2101/04; B01D 2201/02; B01D 2201/28; B01D 2201/302; B01D 35/02; B01D 35/143; B01D 35/31; Y02W 10/10; C02F 3/04; C02F 3/06; C02F 3/10; C02F 3/104; C02F 3/106; C02F 1/001; C02F 1/281; C02F 1/283; C02F 2101/105; C02F 2101/16; C02F 2013/20; C02F 2303/20
See application file for complete search history.

(56) References Cited

U.S. PATENT DOCUMENTS

| | | | | |
|---|---|---|---|---|
| 4,753,731 A | * | 6/1988 | Drori ..................... | B01D 29/46 |
| | | | | 210/488 |
| 6,537,444 B2 | * | 3/2003 | Wilberscheid ......... | B01D 29/21 |
| | | | | 210/85 |
| 10,588,296 B1 | * | 3/2020 | Rimer .................... | B01D 35/31 |
| 2013/0186841 A1 | * | 7/2013 | Johnson .............. | B01D 36/001 |
| | | | | 210/256 |

FOREIGN PATENT DOCUMENTS

| | | | | | |
|---|---|---|---|---|---|
| JP | 2005278603 A | * | 10/2005 | | |
| WO | WO-2015019350 A1 | * | 2/2015 | ............. | B01D 29/46 |

OTHER PUBLICATIONS

JP 2005278603 Machine translation (Year: 2005).*

* cited by examiner

*Primary Examiner* — Duane Smith
(74) *Attorney, Agent, or Firm* — Lance C. Venable; Law Office of Lance C. Venable, PLLC

(57) ABSTRACT

The invention discloses a fish tank or aquarium filter assembly system that utilizes a plurality of stacked and compressed disc filters with a plurality of cross-sectional grooves for filtering debris in the fish tank, eliminates the need to use common fabrics such as socks as the filtering technique, and utilizes the pattern of grooves on the disc filters to be arranged in a pattern that filters debris in a more efficient manner than existing filters.

9 Claims, 8 Drawing Sheets

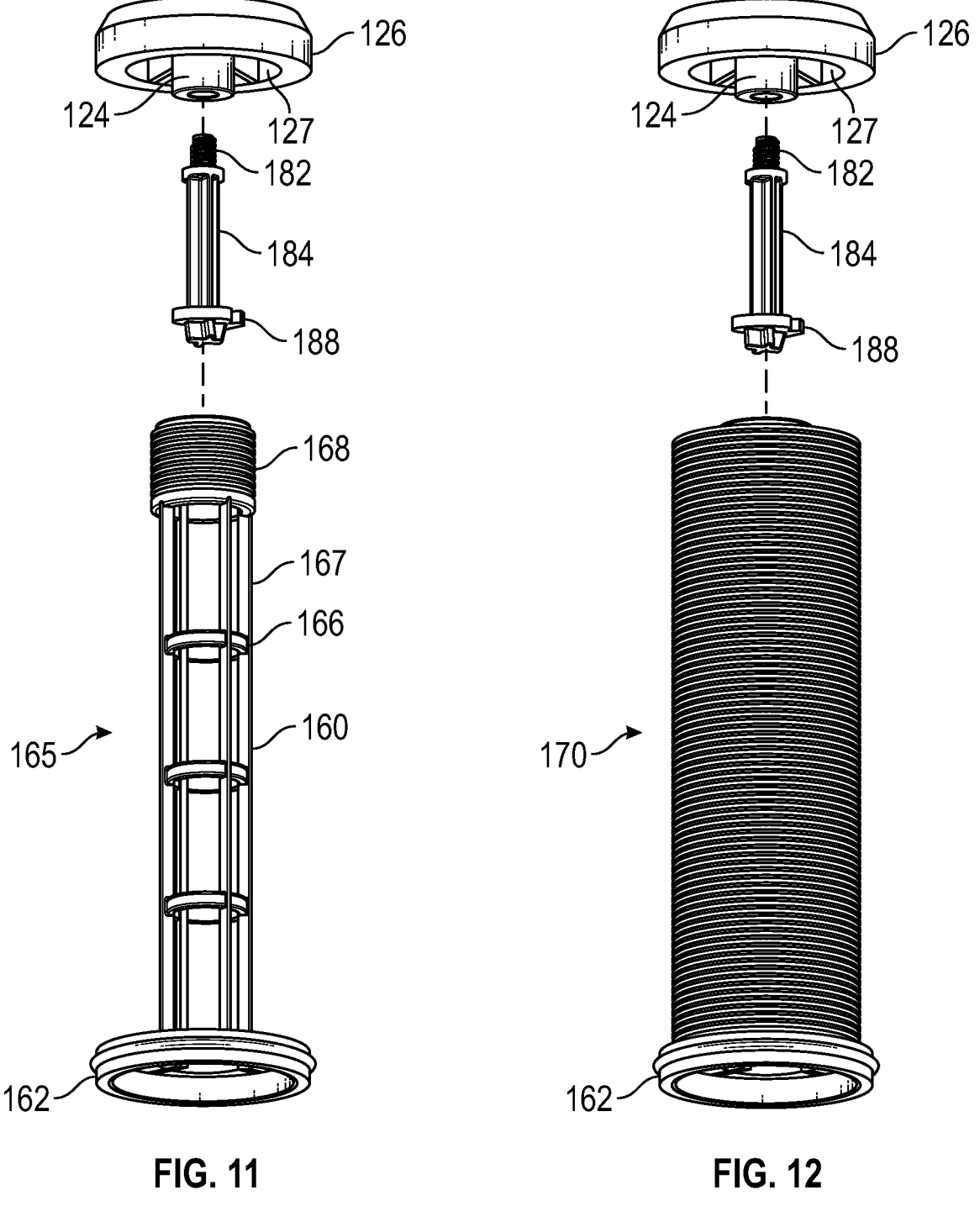
FIG. 11            FIG. 12

FISH TANK FILTER

BACKGROUND OF INVENTION

Field of the Invention

This invention relates to water filtration devices. More specifically, this invention relates to the use of disc water filtration devices that are used in typical residential and commercial saltwater "marine" fish tanks or aquariums.

Description of the Related Art

Any discussion of the prior art in the specification should in no way be considered as an admission that the prior art is widely known or forms part of common general knowledge in the field.

A typical residential/commercial saltwater fish tank includes a finite volume of water. To keep the tank healthy, the water must remain clean and free from contaminants and particulate matter like fish waste in the form of ammonia in urine and feces, as well as algae and other debris that accumulates over time inside the tank. The water cannot maintain stagnant and must circulate. The waste is typically captured in a filter as the water is circulated.

At typical type of filter utilizes a disposable sock. In many existing disposable sock filter devices for fish or reef aquariums, the socks are usually made of a filter material such as a cloth or felt that resemble a tube sock with a plastic rim attached to the top. Sock filters are made to sit in the compartment of the sump area designed for water filtration. In sock or bag-type filter devices, the filter material is made of cloth or felt. Dirty water is pumped and circulated from the tank and through the sock filter so that debris is captured and retained in the sock. In order to prevent these filters from clogging and restricting water flow through the sock, the filters must be removed periodically for cleaning or disposed of. The cleaning procedure involves first removing any accumulated solid debris in a sink, and then washing or laundering the sock to remove any smaller debris particles. The procedure can be messy, time consuming, and expensive.

Other issues can arise using a sock filter. The sock can collapse and reduce the effective filtration surface area. Additionally, the sock itself can lose its effectiveness over time because after several cleanings the material can lose its thickness. Also, when laundering the sock, the washing machine can transport residual detergents and phosphates, which can then be introduced into the tank. Finally, the socks themselves are not recyclable and must be replaced frequently due to wear, which reduces filtration efficiency.

The present invention overcomes the limitations in the prior art in that it offers a solution that provides optimum water filtration that eliminates the need for using materials and methods that are messy, inefficient, and can introduce harmful chemicals to the tank environment.

SUMMARY OF THE INVENTION

The invention is summarized below only for purposes of introducing embodiments of the invention. The ultimate scope of the invention is to be limited only to the claims that follow the specification.

It is an object of this invention to provide a filter assembly for filtering water in a fish or reef tank or aquarium.

It is a further object of the is invention for the filter assembly to include a sleeve apparatus.

It is a further object of this invention for the filter apparatus to comprise a plurality of discs.

It is a further object of this invention for the discs to be stacked and compressed on a spine.

It is a further object of this invention for the spine to be fitted tightly into the sleeve by pressing the spine assembly downward so that the assembly sits vertically in the sleeve.

It is a further object of this invention that the discs comprise of grooves.

It is a further object of this invention that the assembly further comprise an O-ring.

It is a further object of this invention that the assembly further comprise vented lid.

It is a further object of this invention that the assembly further comprise a media cup.

It is a further object of this invention that the assembly further comprise a key.

It is a further object of this invention that the grooves on the disc diagonally grooved on both sides of each disc.

It is a further object of this invention that each groove extends in a direction that is opposite of the grooves on the opposite side of the disc.

It is a further object of this invention that the assembly is sealed using the O-ring.

A person with ordinary skill in the relevant art would know that any shape or size of the elements described below may be adopted. Any combinations of suitable number, shape, and size of the elements described below may be used. Also, any materials suitable to achieve the object of the current invention may be chosen as well.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

FIG. 11 illustrates an exploded front view of a spindle assembly that is used to receive filter discs along its vertical axis.

FIG. 12 illustrates the exploded front view of FIG. 11 showing the filter discs in place.

DETAILED DESCRIPTION OF THE INVENTION

In the following description, and for the purposes of explanation, numerous specific details are provided to thoroughly understand the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed embodiments may be applied. The full scope of the invention is not limited to the example(s) that are described below.

Figure 1:
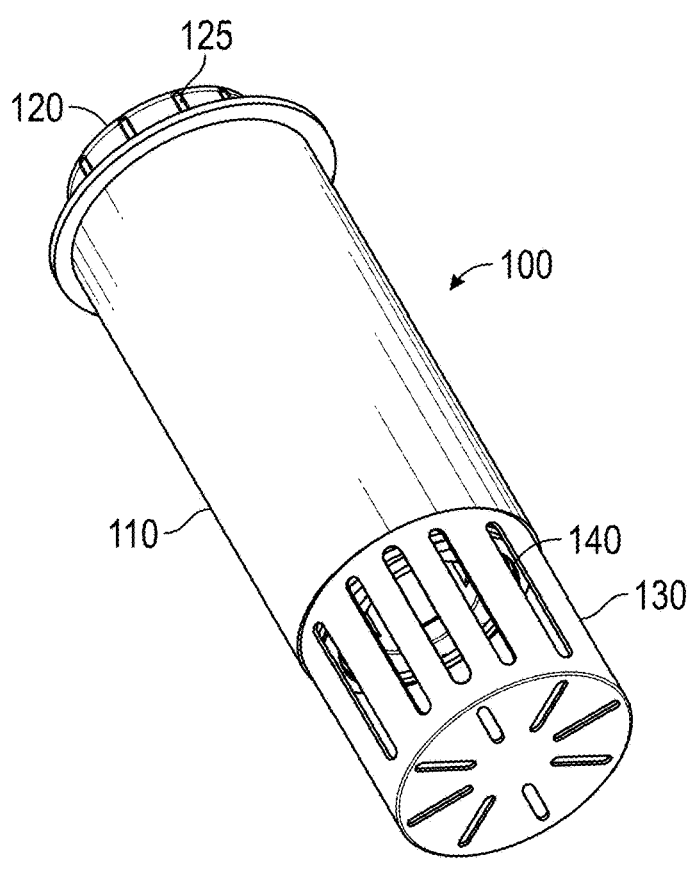
FIG. 1 illustrates a perspective view of a fully assembled fish tank filter assembly.
Figure 2:
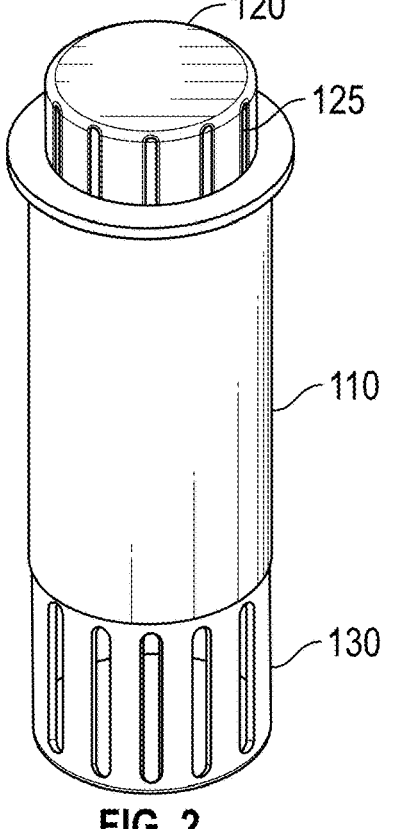
FIG. 2 illustrates a front perspective view of the fully assembled fish tank filter assembly of FIG. 1.

FIGS. 1 and 2 illustrate side and front perspective views of an exemplary embodiment of the invention as used. In this embodiment, an aquarium filter container 100 is shown in its fully assembled form. The aquarium filter container 100 includes a sleeve 110, a media cup 130, and a vented lid 120. The sleeve 110 is generally cylindrical in shape and houses a filter spine 160 as shown in FIG. 11 and others. The media cup 130 is removably coupled to the bottom of the sleeve 110. The media cup 130 includes several vents 140 that allow water to pass through the media cup 130. The vented lid 120 is removably coupled to the top of the sleeve 110 and includes several openings 125 that allow water to pass through the vented lid 120 and into the sleeve 110.

Figure 3:
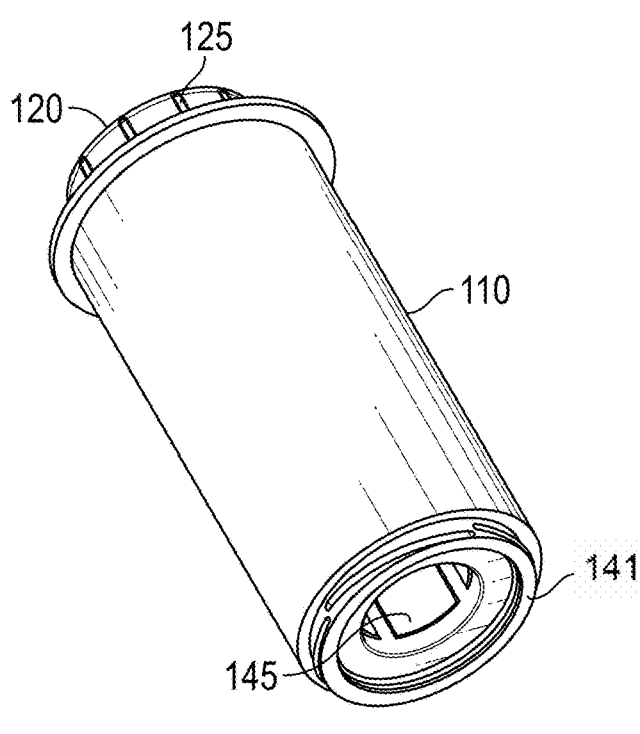
FIG. 3 illustrates a perspective view of the assembled fish tank filter assembly of FIG. 1 without a lower filter cap.

FIG. 3 illustrates the side perspective view of the aquarium filter container 100 with the media cup 130 removed. As shown, the bottom of the sleeve 110 comprises a threaded end 141 for coupling the media cup 130 by rotating it along the threaded end 141 of the sleeve 110. The threaded end also includes an opening 145 that allows water to flow through it.

Figure 4:
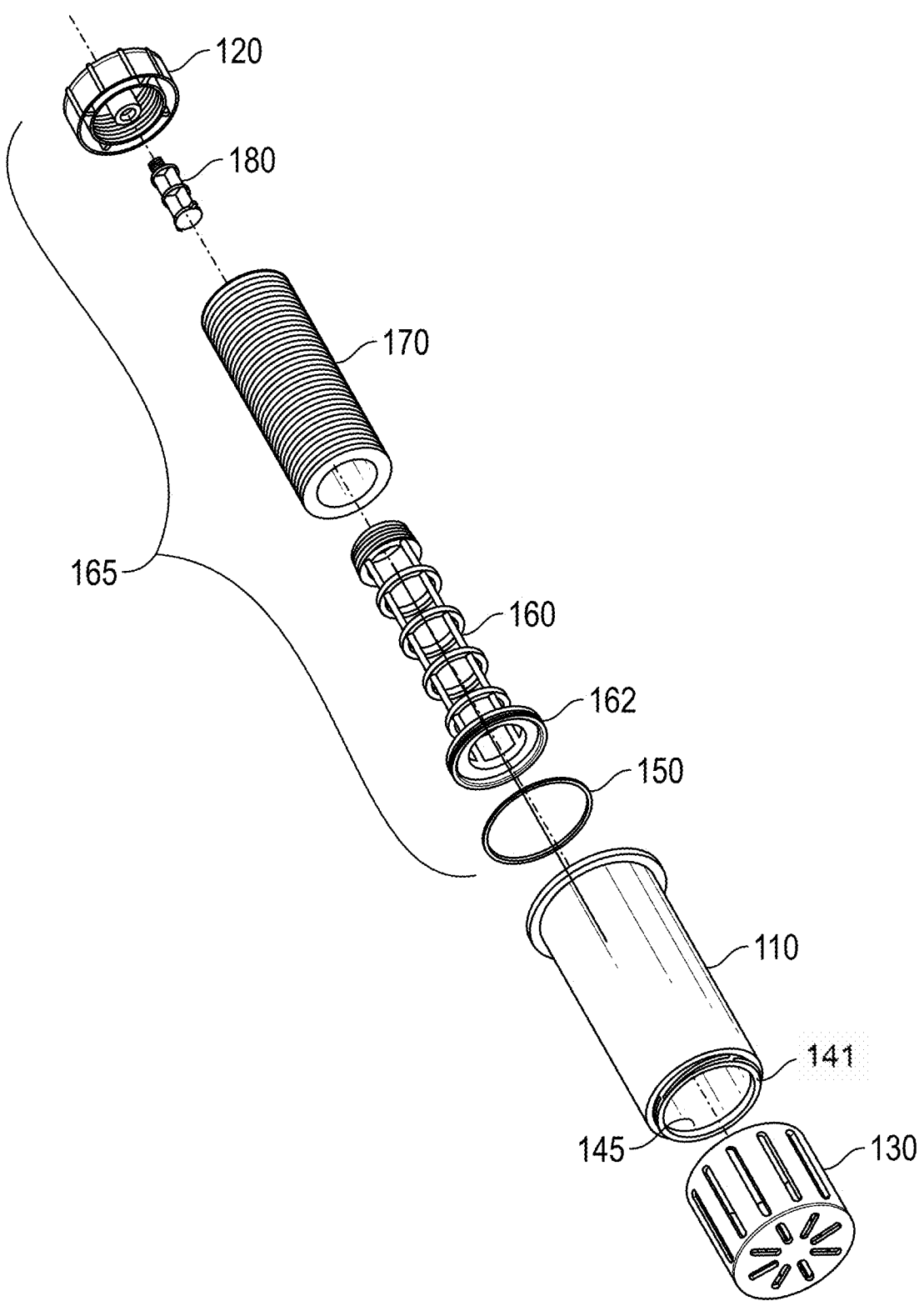
FIG. 4 illustrates an exploded perspective view of the fish tank filter assembly.

FIG. 4 illustrates an exploded perspective view of the aquarium filter container 100 with that includes the filter spine assembly 165. In addition to showing the interaction of the media cup 130, the sleeve 110 and the vented lid 120, the filter spine assembly 165 receives a plurality of disc filters 170 that are stacked and compressed together along the spine 160. The filter spine assembly 165 is inserted into the sleeve 110 and sealed using an O-ring 150 that fits between the bottom 162 of a spine 160 and the threaded end 141 of the sleeve 110. A key 180 serves as a coupling interface between that secures the vented lid 120 to the top of the spine 160 that enables the vented lid 120 to move vertically up or down at the top of the spine 160 along a guide 168 as shown in FIG. 10.

Figure 5:
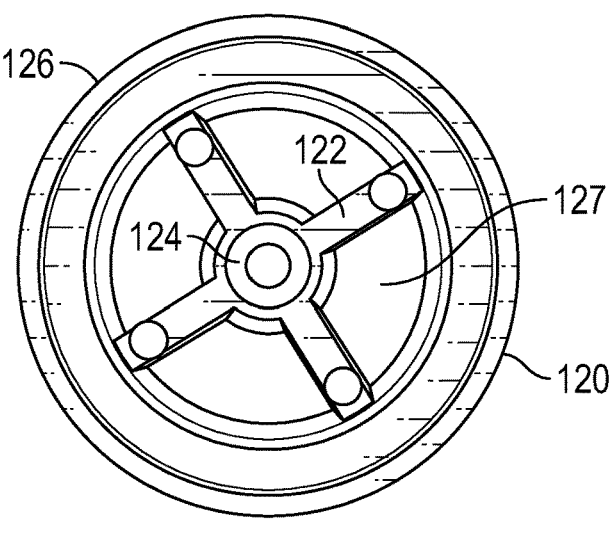
FIG. 5 illustrates a top view of the top cap shown in FIG. 6.
Figure 6:
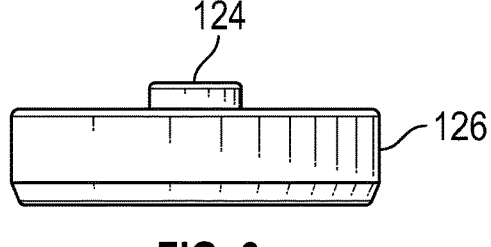
FIG. 6 illustrates a side view of a top cap that is used to secure the spindle assembly shown in FIG. 10.

FIGS. 5 and 6 illustrate a top and side view showing the details in the vented lid 120. The vented lid 120 is comprised of a circular outer portion 126 and includes a plurality of spokes 122 that extend from a center opening 124 to the outer portion 126 that forms at least one opening 127 that allows water to flow through the vented lid 120. The center opening 124 includes an internal thread 128 (shown in FIG. 10) for receiving a threaded portion 182 of the key 180 as shown in FIGS. 7 and 8.

Figure 7:
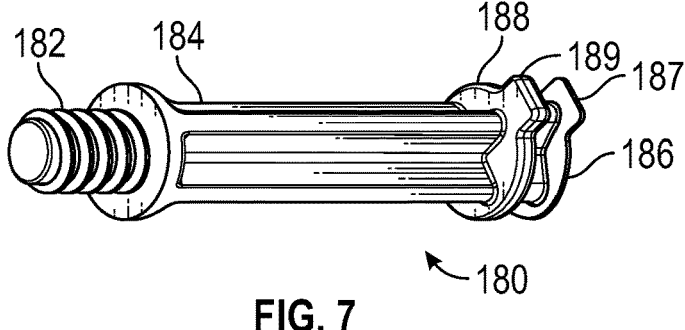
FIG. 7 illustrates a side perspective view of a spindle extension rod that is part of the spindle assembly shown in FIG. 10.
Figure 8:
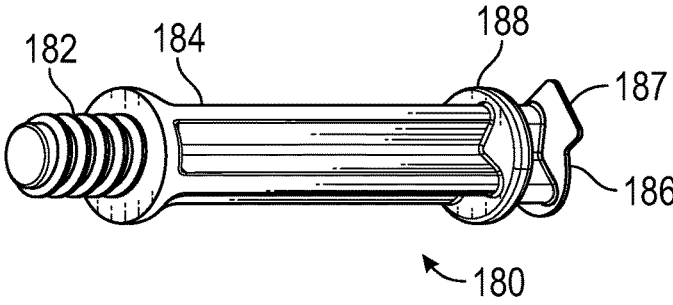
FIG. 8 illustrates a side perspective view of the spindle extension rod shown from the opposite side of the illustration in FIG. 7.

FIGS. 7 and 8 illustrate a front side and a rear side view of the key 180. The key 180 comprises the threaded portion 182 at the top of the key 180, a first lower plate 188, a second lower plate 186, and a central support 184 that couples the threaded portion 182 and the first lower plate 188. The first lower plate 188 includes a first tab 189, and the second lower plate 186 each include a second tab 187. The central support 184 is rotatable with respect to the second lower plate 186 so that the first tab 189 and second tab 187 can be aligned as shown in FIG. 7. When the first tab 189 and second tab 187 are aligned, the key 180, along with the vented lid 120, can be removed from the spine 160 through an opening at the top of the spine 160.

Figures 9, 10:
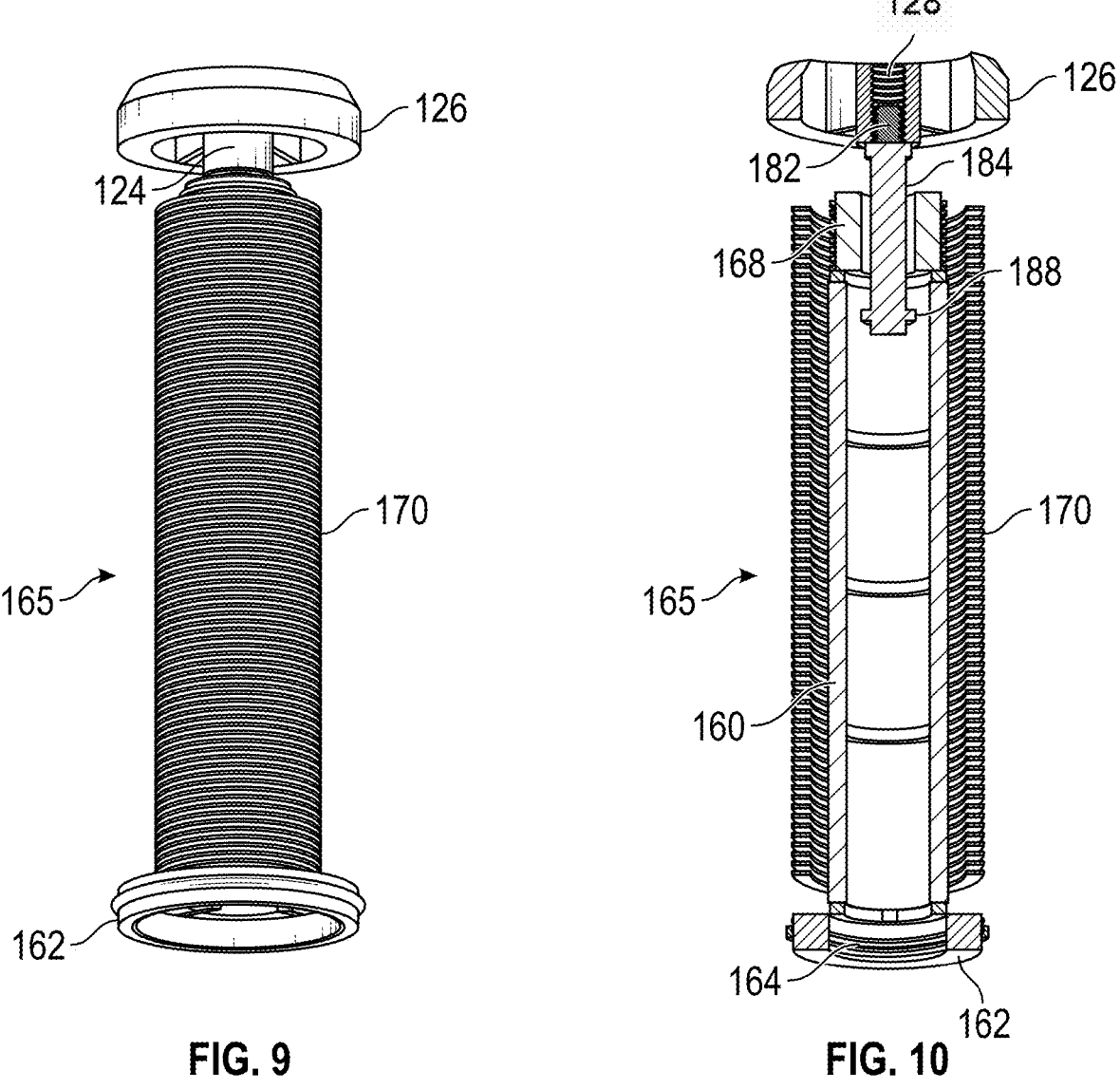
FIG. 9 illustrates the fully assembled spindle in FIGS. 11 and 12.
FIG. 10 illustrates a front cross-sectional view of the assembled spindle shown in FIG. 9.

FIG. 9 illustrates a side view of the filter spine assembly 165. The filter spine assembly shows the plurality of disc filters 170 compressed and aligned along the spine 160 in between the bottom 162 of the spine 160 and the vented lid 120 where the center opening 124 is secured to the spine 160.

FIG. 10 illustrates a cross-sectional side view of the spine assembly 165 shown in FIG. 9. The internal thread 128 in the central opening 124 of the vented lid 120 is shown receiving the threaded portion 182 of the key 180. The key 180 can slide vertically up and down a guide 168 along the central support 184 with the first lower plate 188 used as a stopper on the lower end of the key 180. The guide 168 is secured to the spine 160 at its upper end. The bottom 162 of the spine 160 is shown and includes internal threads 164.

FIG. 11 illustrates an exploded front view of just the filter spine assembly 165. The structure of the spine 160 includes a series of vertical supports 167 that are joined by way of a plurality of circular couplings 166 along the vertical supports 167. The guide 168 secures the vertical supports 167 at the top end of the spine 160. FIG. 12 shows the same illustration in FIG. 11 with the filter discs 170 stacked and compressed along the spine 160.

Figures 13, 14:
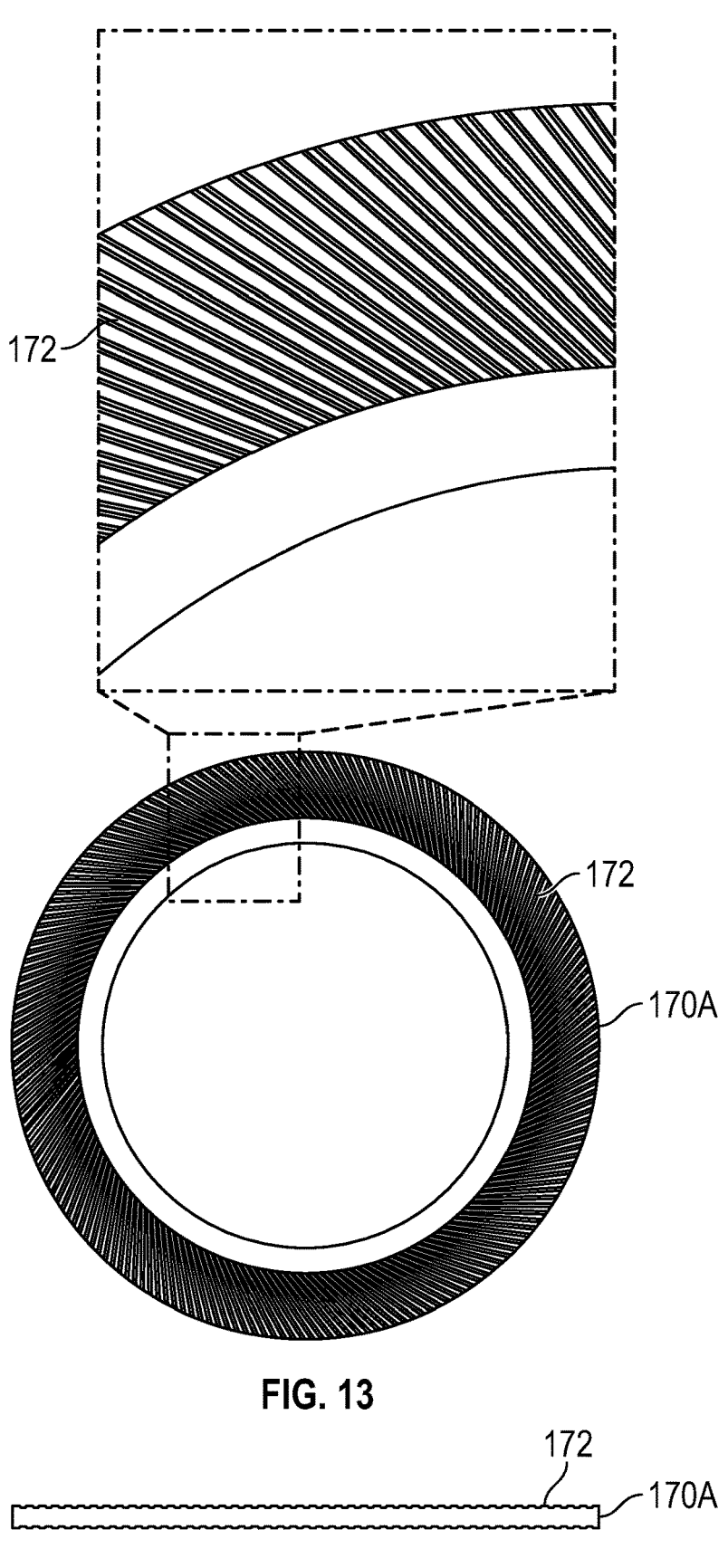
FIG. 13 illustrates a top view of a filter disc that includes a sectional view of a portion of the filter disc.
FIG. 14 illustrates a side view of the filter disc.

FIG. 13 illustrates a top view of a single filter disc 170A and a sectional view of the filter disc 170. In the preferred embodiment, the disc filter 170 is made from polypropylene materials. Each disc 170A includes a plurality of angled grooves 172 that diagonally extend between the inner and outer rings of the disc 170A. FIG. 14 illustrates a side view of the disc 170A showing the pattern of the angled grooves 172. The grooves 172 of each disc 170A can vary in size, but in the preferred embodiment are between 20 and 400 microns wide. The grooves 172 enable water to flow from the outer to the inner ring of the disc 170A while trapping debris that may be larger than the width of the grooves 172.

Figure 15:
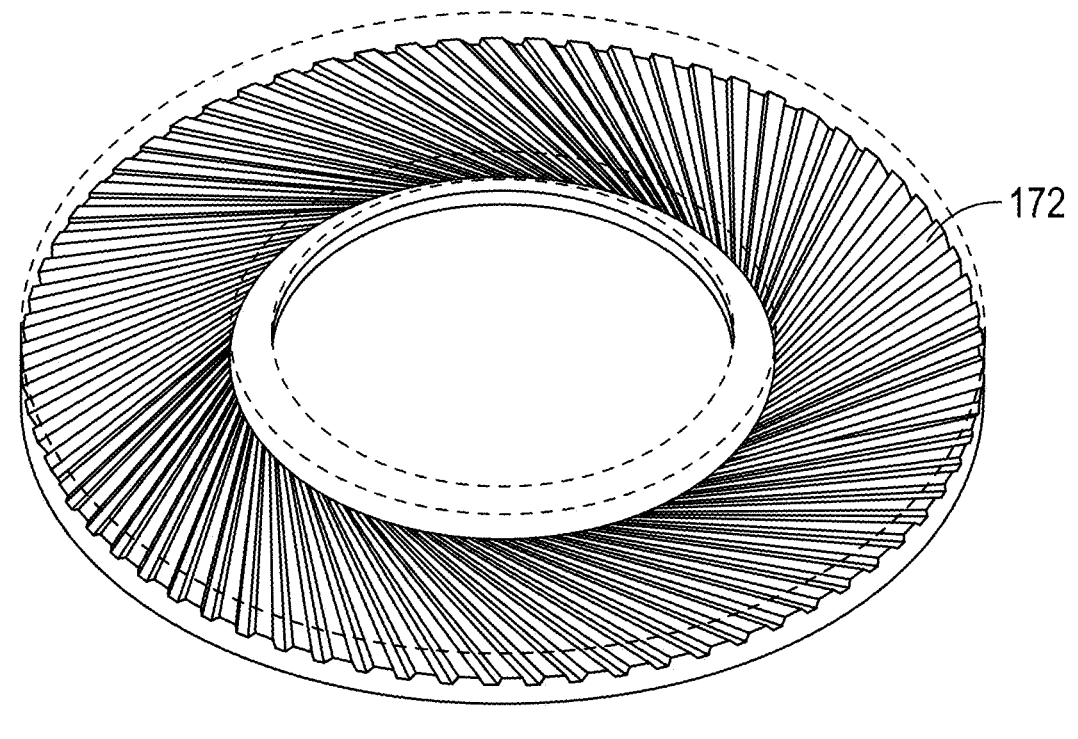
FIG. 15 illustrates a front perspective view of the filter disc of FIG. 13.

FIG. 15 illustrates a front perspective view of the disc 170A shown in FIG. 13, which provides an alternate view of the pattern of the grooves 172.

Figure 16:
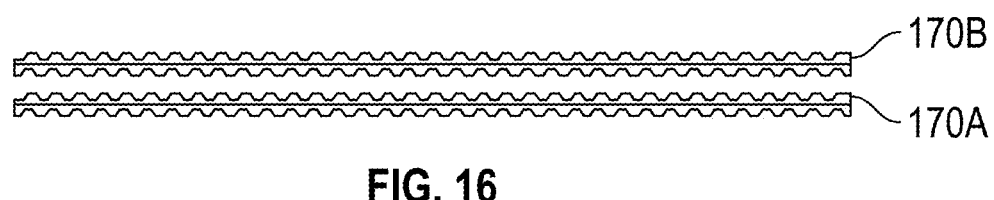
FIG. 16 illustrates a side view of a pair of separate filter discs.
Figure 17:
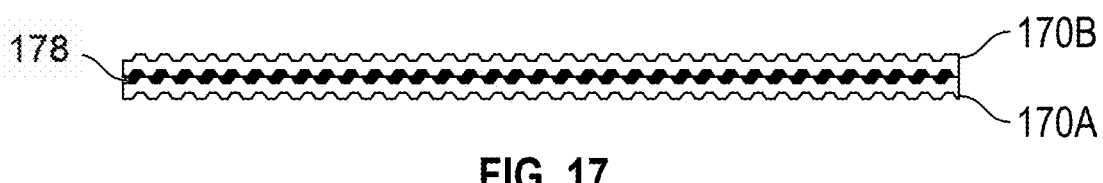
FIG. 17 illustrates a side view of a pair of filter discs shown as assembled in FIG. 12.
Figure 18:
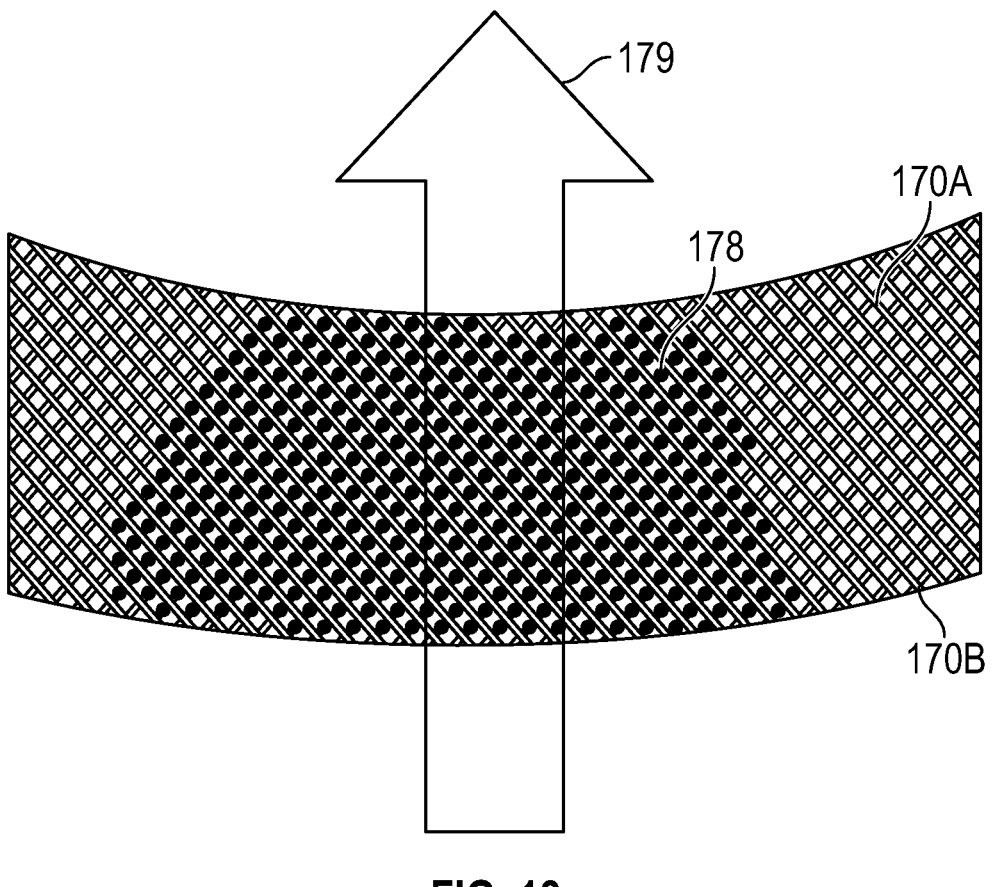
FIG. 18 illustrates a top, sectional view of a portion of a pair of assembled filter discs showing the direction of water flow through the pair of filter discs.

FIG. 16 illustrates a side view of a pair of the discs 170A and 170B when the discs 170A and 170B are separated prior to stacking and compressing them. FIG. 17 illustrates the side view of the discs in FIG. 16 when the discs 170A and 170B are compressed and stacked. As can be seen in FIG. 17, the discs 170A and 170B are stacked so that the diagonal grooves 172 run opposite to each other in a crisscross pattern, which is more aptly shown in FIG. 18. By using this pattern, more dirt and debris 178 in the pre-filtered water flow can be trapped in the grooves 172 between discs 170A and 170B as the water flow 179 flows from the outer ring to the inner ring of the discs 170A and 170B. As this pattern of stacking the discs 170 is repeated along the entire spine 160, a substantial amount of debris 178 can be trapped while from the pre-filtered water flow at the same time allowing clean water to flow back into the aquarium.

A person with ordinary skill in the relevant art would know that any shape or size of the elements may be adopted as long as they enable the invention to operate as intended. Also, any materials suitable to achieve the objects of the current invention may be chosen.

What is claimed is:

1. An aquarium water filter assembly comprising:
   a. a spine comprising:
      i. a top end,
      ii. a bottom end, and
      iii. a plurality of vertical supports extending from the bottom end to the top end of the spine forming a hollow center and at least one opening between the plurality of vertical supports;
   b. a plurality of disc filters wherein each disc filter comprises:
      i. a top and bottom surface,
      ii. a central aperture that forms an inner perimeter, and
      iii. an outer perimeter,
      iv. wherein the top surface comprises a plurality of first grooves extending diagonally from the inner perimeter to the outer perimeter with respect to the inner perimeter,
      v. wherein the bottom surface comprises a plurality of second grooves extending diagonally from the inner perimeter to the outer with respect to the inner perimeter that is opposite of the direction of the first grooves on the top surface, and
      vi. each of the plurality of disc filters is coupled to the spine along the plurality of vertical supports so that when the plurality of disc filters are stacked on the plurality of vertical supports together the first and second grooves between each of the disc filters are orthogonal to each other,
   c. a sleeve comprising a bottom end and a top end, whereby:

i. the bottom end of the sleeve is coupled to the bottom end of the spine and encapsulates the plurality of disc filters; and
   ii. the bottom end of the sleeve comprises an opening configured to allow water flow through the bottom end;
   d. a lid comprising a vent configured to allow water to flow through the vent wherein the lid is coupled to the top end of the sleeve;
   e. a key, wherein the key comprises a top end and a bottom end such that the top end of the key is coupled to the lid and the bottom end of the key is coupled to the top end of the spine; wherein the bottom end of the key further comprises a first plate and a second plate that is rotatably coupled to the first plate, and wherein the key is vertically adjustable with respect to the spine.

2. The aquarium water filter assembly in claim 1 further comprising a media cup, wherein the media cup comprises a vent and is coupled to the bottom end of the sleeve.

3. The aquarium water filter assembly of claim 1 further comprising an o-ring, wherein the o-ring is secured between the bottom end of the spine and the bottom end of the sleeve.

4. The aquarium water filter assembly of claim 1 wherein the first plate comprises a first tab and the second plate comprises a second tab such that when the first and second tabs are aligned, the key can be removed from the spine.

5. The aquarium water filter assembly of claim 1 wherein the top end of the key is threadably coupled to the lid.

6. The aquarium water filter assembly of claim 1 wherein the sleeve is cylindrical.

7. The aquarium water filter assembly of claim 1 wherein the spine further comprises a plurality of circular couplings wherein the circular couplings are coupled to the vertical supports.

8. The aquarium water filter assembly of claim 1 wherein the plurality of the first grooves and the plurality of the second grooves are between 20 and 400 microns wide.

9. The aquarium water filter assembly of claim 2 wherein the assembly creates a water flow from the outer perimeters of the plurality of disc filters to the inner perimeters of the disc filters out through the vent in the media cup.

\* \* \* \* \*